US011089379B2

(12) United States Patent
Pantos

(10) Patent No.: US 11,089,379 B2
(45) Date of Patent: Aug. 10, 2021

(54) PRELOAD HINTING FOR LOW LATENCY HTTP LIVE STREAMING SYSTEM

(71) Applicant: Apple Inc., Cupertino, CA (US)

(72) Inventor: Roger N. Pantos, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/119,475

(22) Filed: Dec. 11, 2020

(65) Prior Publication Data

US 2021/0185401 A1  Jun. 17, 2021

Related U.S. Application Data

(60) Provisional application No. 62/946,862, filed on Dec. 11, 2019.

(51) Int. Cl.
| | | |
|---|---|---|
| H04N 21/482 | (2011.01) | |
| G06F 16/438 | (2019.01) | |
| G06F 16/955 | (2019.01) | |
| H04L 29/08 | (2006.01) | |
| H04L 29/06 | (2006.01) | |

(52) U.S. Cl.
CPC ..... *H04N 21/4825* (2013.01); *G06F 16/4387* (2019.01); *G06F 16/955* (2019.01); *H04L 65/4084* (2013.01); *H04L 65/602* (2013.01); *H04L 65/608* (2013.01); *H04L 67/02* (2013.01)

(58) Field of Classification Search
CPC ............... G06F 16/4387; G06F 16/955; H04L 65/4084; H04L 65/602; H04L 65/608; H04L 67/02; H04L 43/08; H04N 21/4825; H04N 21/23424; H04N 21/2402; H04N 21/4753; H04N 21/6581; G10L 15/14

See application file for complete search history.

(56) References Cited

U.S. PATENT DOCUMENTS

| | | | |
|---|---|---|---|
| 8,156,089 B2 | 4/2012 | Pantos et al. | |
| 8,650,192 B2 | 2/2014 | Biderman et al. | |
| 2012/0110619 A1* | 5/2012 | Kilar | H04N 21/23424 725/34 |
| 2013/0174271 A1* | 7/2013 | Handal | H04N 21/4753 726/27 |
| 2014/0380376 A1* | 12/2014 | Schmidt | H04L 65/4084 725/54 |
| 2017/0374320 A1* | 12/2017 | May, Jr. | H04N 21/6581 |
| 2018/0302452 A1* | 10/2018 | Pantos | H04L 67/02 |

(Continued)

OTHER PUBLICATIONS

"hlsjs-rfcs | RFCs for changes to Hls.js", https://video-dev.github.io/hlsjs-rfcs/docs/0001-lhls, Nov. 13, 2019, 14 pages.

*Primary Examiner* — Le H Luu
(74) *Attorney, Agent, or Firm* — Womble Bond Dickinson (US) LLP

(57) ABSTRACT

Streaming media systems, such as HTTP Live Streaming, can provide a low latency service by including, within a playlist, a URI that identifies a future media segment that will become available after the playlist is completed. Client devices can receive the playlist and can make two separate blocking requests for an updated playlist and for the future media segment. This approach allows the use of HTTP 1.1 to request and receive playlists and media segments and allows the use of two different servers to provide the playlist in the future media segment.

26 Claims, 4 Drawing Sheets

(56) References Cited

U.S. PATENT DOCUMENTS

| | | | |
|---|---|---|---|
| 2019/0312797 A1* | 10/2019 | Sen | H04L 43/08 |
| 2019/0342419 A1* | 11/2019 | Bromand | H04N 21/2402 |
| 2020/0015052 A1* | 1/2020 | Schulert | H04L 65/4084 |
| 2020/0059682 A1* | 2/2020 | Coburn, IV | G06F 16/4387 |
| 2020/0213725 A1* | 7/2020 | Lang | G10L 15/14 |
| 2020/0267437 A1 | 8/2020 | Pantos | |

* cited by examiner

PRELOAD HINTING FOR LOW LATENCY HTTP LIVE STREAMING SYSTEM

This application claims the benefit of U.S. Provisional Patent Application No. 62/946,862, filed on Dec. 11, 2019, and this provisional application is hereby incorporated herein by reference.

BACKGROUND

Many devices presently use streaming media content delivery systems to present content such as movies, television shows, recorded sports events, news programs, live events such as live sports events, live news events, etc. These streaming media content delivery systems typically use one or more playlists that enumerate an ordered series of uniform resource identifiers (URIs), such as uniform resource locators (URLs), to identify media segments that can be retrieved from one or more servers using conventional HTTP compliant requests. Once retrieved, the media segments can be presented on the client device that requested the media segments and then erased on the client device after the presentation of each of the media segments. These streaming media content delivery systems can display both recorded content, such as a movie or video on demand content or live content such as a live sports event or live news event that is happening at the same time that the user of a client device is watching the live sports event or live news event. The existing streaming content delivery systems include the DASH (Dynamic Adaptive Streaming over HTTP) based systems that are based on a standard (such as ISO/IEC 23009-1:2014) and systems from Apple Inc. based on Apple's HTTP live streaming (HLS) systems.

These existing systems can have difficulty delivering content for live events in a manner that has low latency relative to the live event. For example, for a live sports event that is happening while a user is viewing the live sports event using a streaming media system, an action that happened in the live event might not be displayed by the streaming media system until many seconds (e.g., 15 seconds or more) after the live event occurred (in real time). Many users may find this large latency disappointing, and thus there is a need to improve the latency of delivery in streaming media systems. This disclosure provides various solutions to solve this need.

SUMMARY OF THE DESCRIPTION

Streaming media systems, such as HTTP Live Streaming (HLS), can provide a low latency streaming service by including, within an HLS playlist, a URI that identifies a future media segment that will become available after the playlist is completed. An origin server system, at the time of creating the playlist, can determine the URI (e.g., a preload hint URI) it will use when the future media segment is produced and save that URI for use when the future media segment is produced. The origin server can then add the URI (e.g., a preload hint URI) into the playlist and make the playlist available for downloading to client devices. Client devices can request and receive the playlist, which includes the URI that identifies the future media segment, and can make two separate blocking requests: one for an updated playlist (that follows the current, just received playlist) and another for the future media segment. A server which receives these blocking requests can block the completion of a response to the blocking request until the updated playlist is completed or the future media segment is completed. This approach allows the use of HTTP 1.1 to request and receive playlists and media segments and allows the use of two different servers to provide the playlist and the future media segment. This approach can also allow the client devices to request and receive the future media segment using the URI without waiting to receive the updated playlist that contains the URI for that segment (as a regular segment); in other words, a client device can use the URI (e.g., the preload hint URI) to request the future media segment and can receive the future media segment before receiving the updated playlist that can contain a URI identifying the future media segment after it has already been requested. This approach can be an extension of the existing HLS protocol documented in RFC 8216 and draft-pantos-hls-rfc8216bis. This approach can also be used with aspects and embodiments described in U.S. provisional patent application No. 62/807,329, filed Feb. 19, 2019 by inventor Roger N. Pantos, and this provisional patent application is hereby incorporated herein.

A method, according to one aspect that can be implemented by a client device, can include the following operations: receiving a first playlist in a transfer protocol compliant manner, the first playlist comprising a plurality of URIs, the plurality of URIs indicating an order of playback of multiple media segments that can be received, in the transfer protocol compliant manner, to re-create a stream of data, wherein the first playlist comprises a last URI in the order that identifies a last available media segment in the first playlist; receiving one or more of the multiple media segments; detecting, in the first playlist, a first URI that identifies a future media segment that was not available when the first playlist was created; sending, in response to detecting the first URI that identifies the future media segment, a first blocking request for the future media segment; sending, in response to receiving the first playlist, a second blocking request for a first updated playlist, and receiving the first updated playlist. In one aspect, the method can include an additional operation which can comprise: receiving a media segment corresponding to the first URI that identified the future media segment. According to one aspect, the first blocking request can be sent to a first server and the second blocking request can be sent to a second server which is in a different domain than the first server's domain. In one implementation, the transfer protocol compliant manner can be based on one of HTTP 1.1 or HTTP 2.0, and the first blocking request and the second blocking request can be separate and distinct requests that are sent separately from a client device. The first blocking request can cause a server that receives the first blocking request to block a response to the first blocking request until the future media segment is available, and the second blocking request can cause a server that receives the second blocking request to block a response to the second blocking request until the first updated playlist is available. In one implementation of an aspect described herein, the first URI that identifies the future media segment follows the last URI in the first playlist. In one implementation, the method can further include the operation of: mapping the future media segment to a regular media segment in response to detecting that the first URI is now associated with a regular media segment in the first updated playlist.

According to one aspect, the method can further include the operations of: detecting, in the first updated playlist, a second URI that identifies a further future media segment that was not available when the first updated playlist was created; sending, in response to detecting the second URI that identifies the further future media segment, a third blocking request for the future media segment; and sending, in response to receiving the first updated playlist, a fourth blocking request for a second updated playlist. According to one aspect, the method can further include the operations of: determining whether the first URI is now associated with a regular media segment in the first updated playlist; and abandoning use of the first URI in response to (1) determining that the first URI is not associated with a regular media segment in the first updated playlist and (2) determining that the first updated playlist no longer identifies the first URI as the next future media segment. According to one aspect described herein, the method can further include the operations of: determining whether the first URI is now associated with a regular media segment in the first updated playlist; and sending a third blocking request for a second updated playlist in response to (1) determining that the first URI is not associated with a regular media segment in the first updated playlist and (2) determining that the first updated playlist still identifies the first URI as the next future media segment.

A method, according to one aspect that can be implemented by a server device, can include the following operations: generating a first playlist for use in a transfer protocol compliant manner, the first playlist comprising a plurality of URIs, the plurality of URIs indicating an order of playback of multiple media segments that can be received at the client device, in the transfer protocol compliant manner, to recreate a stream of data at the client device, the first playlist comprising a last URI in the order that identifies a last available media segment in the first playlist; determining a first URI that identifies a future media segment that was not available when the first playlist was created; adding the first URI to the first playlist; receiving, from a first client device, a first blocking request for the first playlist and transmitting to the first client device in response to the first blocking request, the first playlist if it is available. According to one aspect the server can block a response to the first blocking request until the first playlist is completed and available. The first blocking request can be sent to a first server system that is in a first domain (such as a first network domain), and the second blocking request can be sent to a different server in a second domain (such as a second network domain) that is not part of the first domain. When a server receives a second blocking request for the future media segment, the server can block a response to the second blocking request until the future media segment is available. According to one aspect, one or more server systems can establish a socket connection for the first blocking request from the first client device and can keep that socket connection open while the response to the first blocking request is blocked and while the first playlist is transmitted to the first client device. In one aspect, the first playlist can specify that the data processing system can support blocking requests for future media segments to provide low latency streaming service from one or more origin servers that complete the creating of the playlists and make the playlist available for transmission to one or more client devices.

According to one aspect, the method can further include the following operations: updating the first playlist to create a first updated playlist and determining a second URI that identifies a further future media segment that was not available when the first updated playlist is being created, and adding, into the first updated playlist, the second URI; receiving a second blocking request for the first updated playlist; transmitting, in response to the second blocking request, the first updated playlist when the first updated playlist becomes available, the response to the second blocking playlist being blocked until the first updated playlist is available. The first updated playlist can be transmitted and is not blocked even though the further future media segment may not be available.

The embodiments described herein can include non-transitory machine readable media that store executable computer program instructions that can cause one or more data processing systems (such as client devices and one or more server systems) to perform the one or more methods described herein when the computer program instructions are executed by the one or more data processing systems. The instructions can be stored in nonvolatile memory such as flash memory or volatile memory such as dynamic random access memory or other forms of memory.

The above summary does not include an exhaustive list of all embodiments in this disclosure. All systems and methods can be practiced from all suitable combinations of the various aspects and embodiments summarized above and also those disclosed in the Detailed Description below.

BRIEF DESCRIPTION OF THE DRAWINGS

The aspects described herein are illustrated by way of example and not by limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one aspect" or "one embodiment" or "an embodiment" or "an aspect" means that a particular feature, structure, or characteristic described in conjunction with the aspect or embodiment can be included in at least one aspect or one embodiment. The appearances of the phrase "in one embodiment" or "in one aspect" in various places in the specification do not necessarily all refer to the same embodiment or same aspect. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
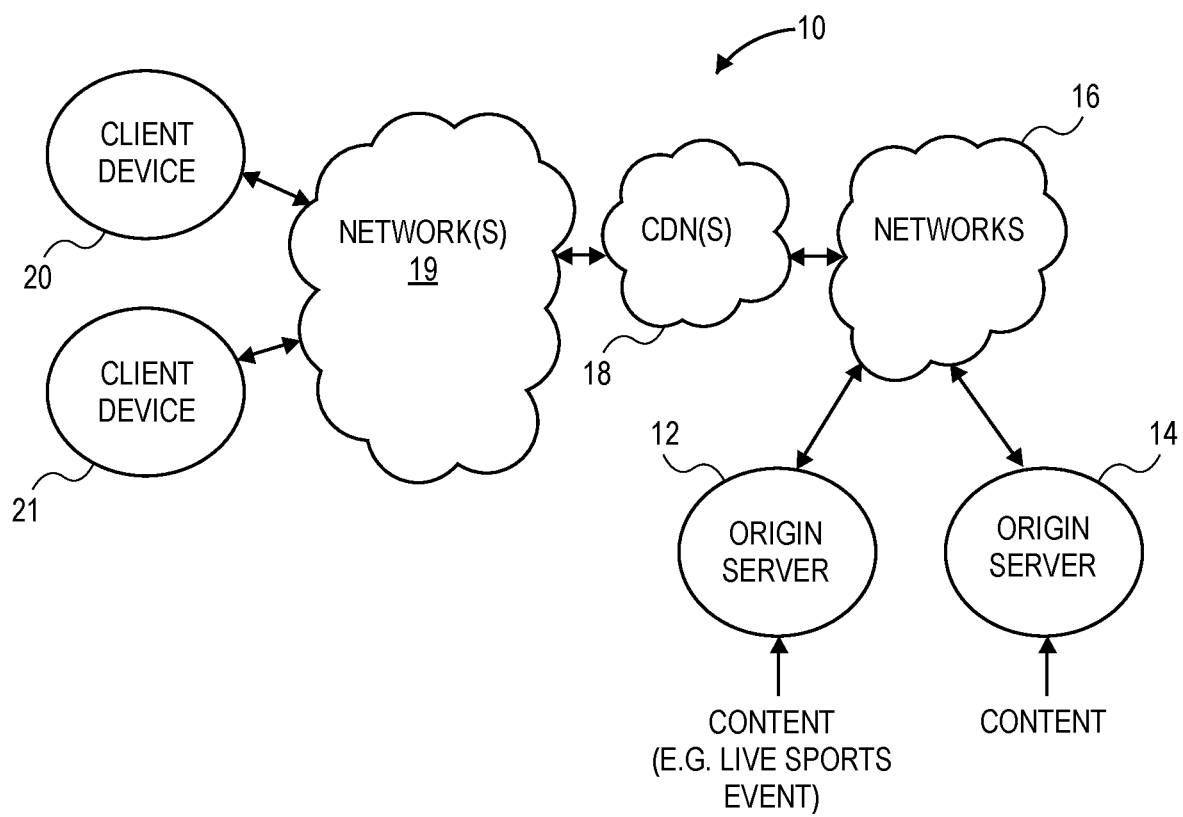
FIG. 1 shows an example of a content delivery system that can include one or more client devices and one or more origin servers which communicate with each other through a connection medium such as one or more networks which can include one or more content delivery networks.

FIG. 1 shows an example of a content delivery system 10 which can be used in the one or more aspects described herein. The content delivery system 10 can include one or more client devices such as client device 20 and client device 21 which are coupled to one or more networks 19 (such as, for example, the Internet) which in turn can be coupled to one or more content delivery networks (CDNs) 18 which in one implementation can be optional. The one or more content delivery networks 18 can be coupled in turn to one or more origin servers, such as origin server 12 and origin server 14 through one or more networks such as networks 16 which can be part of the one or more networks 19. The one or more networks 16 and one or more networks 19 can be part of the Internet or can be part of proprietary networks, or can be a combination of the Internet and proprietary networks etc. The one or more origin servers, such as origin server 14 and origin server 12 can be coupled to sources of content. The content can include live content such as live sports events or live news events, etc. in addition to previously recorded (not live) content such as movies, TV shows and other content. The content can be divided up into media segments and the media segments can be stored by the one or more origin servers and the one or more origin servers can create media playlists containing identifiers, such as URIs, that refer to the media segments. The various client devices and server systems described herein can be one of the systems shown in FIG. 1.

Figure 2:
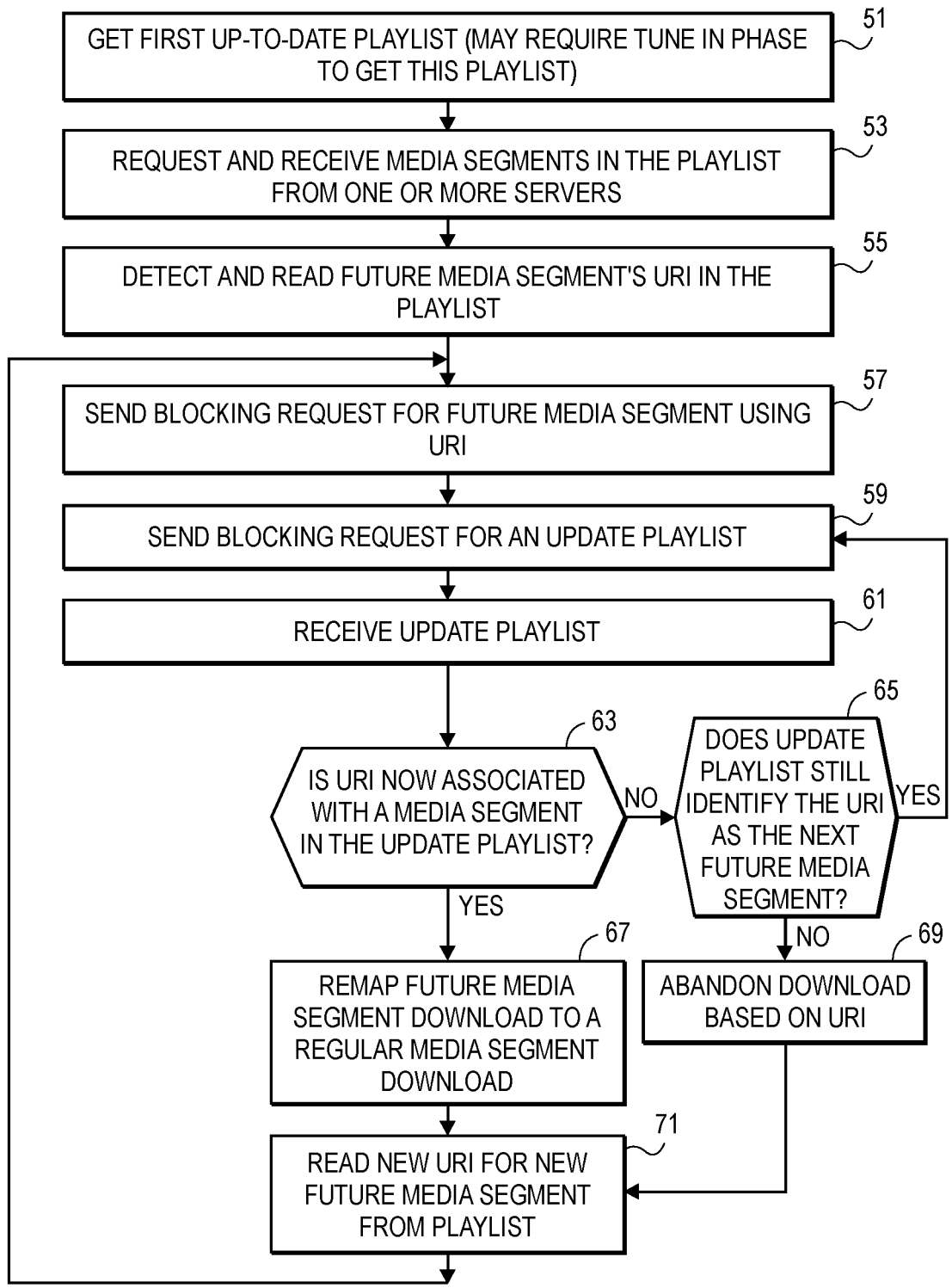
FIG. 2 shows a flowchart which illustrates a method which can be performed by one or more client devices according to an aspect described herein.

A method according to one aspect that can be performed by a client device is shown in FIG. 2. The method shown in FIG. 2 can begin after the client device has completed a tune-in phase so that it is receiving a playlist that is near the live edge; thus, a client device may have already received and processed one or more playlists for the program prior to operation 51 shown in FIG. 1. In operation 51, the client device can request and receive an up-to date playlist that is near the live edge of the program. In operation 53, the client device can request and receive media segments that are in the playlist that was obtained in operation 51. The media segments can be requested and received from one or more servers which can be servers in a content delivery network or origin servers, etc. In operation 55, the client device can detect and read a URI in the playlist received in operation 51, which URI identifies a future media segment. This URI can be referred to as a preload hint URI. This URI was added by, for example, an origin server into the playlist when the origin server predicted the URI for the future media segment which was not available at the time the playlist was created. Further details with respect to these actions of an origin server will be provided further below in conjunction with a description of the method shown in FIG. 3. According to one aspect, the URI for the future media segment can follow the last URI for a media segment which can be downloaded using the current playlist. Then in operation 57, the client device can send a blocking request for the future media segment using the URI detected in operation 55. The blocking request for the future media segment can be received by a server, such as an origin server, which will block completion of a response to the request until the future media segment is available. In operation 59, the client device can also send a blocking request for an updated playlist; the sending of the blocking request for an updated playlist can be performed in response to receiving the current playlist in operation 51 or can be performed at some later point in time depending on the implementation. In this example, the client device can make the blocking request for the future media segment before requesting (in operation 59) the updated playlist so that the client device may be able to receive the future media segment before receiving the updated playlist. This also allows the server to begin sending the future media segment to the client device without waiting for the client device to receive the updated playlist and then turn around and request the future media segment. The blocking request for an updated playlist can be received by a server which can block completion of a response to the request until the updated playlist is available. Once the updated playlist is available, it can be received in operation 61 by the client device. In the example shown in FIG. 2, the client device can perform a set of operations to determine how to process the received playlist, and these operations are shown as operations 63, 65, 67, and 69. In operation 63, the client device can determine whether the URI detected in operation 55 is now associated with a media segment that is downloadable in the current update playlist that was received in operation 61. If the URI is now associated with a currently available media segment in the current update playlist, then processing can proceed to operation 67. In operation 67, the client device can re-map the future media segment download to a regular media segment download. As is known in the art, client devices can maintain information about the media segments that have been downloaded in order to keep track of the presentation of the media segments by the client device. The remapping in operation 67 allows the client device to properly account for the future media segment by mapping it to a regular media segment that can be downloaded using the update playlist that was received in operation 61. Referring back to operation 63, if that operation determines that the URI detected in operation 55 is not associated with a media segment in the update playlist which was received in operation 61, then processing proceeds from operation 63 to operation 65. In operation 65, the client device determines whether the update playlist (that was received in operation 61) still identifies the URI (detected in operation 55) as the next future media segment. If the update playlist still identifies the URI (detected in operation 55) as the next future media segment, then the client device decides that it needs to request the update playlist again to get a fresh update playlist and thus processing proceeds from operation 65 to operation 59. If operation 65 determines that the update playlist received in operation 61 no longer identifies that URI as the next future media segment, then processing proceeds to operation 69. In operation 69, the client device determines that the URI (e.g., preload hint URI) is not to be used and therefore abandons attempts to download media segments based on that URI. After either operation 69 or operation 67, processing proceeds to operation 71, in which the client device reads the new URI (e.g., a new preload hint URI) for the new future media segment from the update playlist which was received in operation 61. This new URI will be used in operation 57 as processing reverts back to operation 57 from operation 71 as shown in FIG. 2. Thus, the client device can perform a sequence of operations in a loop of operations returning back to operation 57 using the new URI for the new future media segment from the current update playlist.

The method shown in FIG. 2 can be employed in systems which use older versions of the HTTP protocol such as HTTP 1.1, and thus the systems can be employed to provide low latency service without using newer versions of the HTTP protocol such as HTTP 2.0. Moreover, the method shown in FIG. 2 can be used without requiring HTTP 2.0 push to push media segments to a client device from one or more servers. The method shown in FIG. 2 can also be employed in systems where an update playlist comes from one server, such as an origin server or server in a content delivery network, and a future media segment (e.g. identified by a preload hint URI) comes from a different server such as a server that provides advertising content. In particular, the blocking request for an update playlist can be sent to an origin server or a server in a content delivery network while the blocking request for the future media segment can be sent to a different server in a different domain, such as a server that distributes advertising content. The two different servers can be in different domains where each domain is separate and distinct and one is not part of the other. According to one aspect, the URI for the future media segment can be a range of a larger resource such as a portion of the file. According to another aspect, the URI for the future media segment can indicate that the client device should retrieve the entire resource, perhaps starting from a known offset even though parts will end up being sub-ranges of that resource when they appear. In this case, the client device can be responsible for dividing out large pre-fetches into individual ranges. According to one aspect, the client device can measure the bandwidth or speed (e.g., bit rate over time) of the network when downloading media segments to determine if it should switch to a higher or lower quality version of the media stream; to support measurements of bandwidth, a server (in one implementation) should not deliver bytes of the future media segment until it appears in the current playlist that is being generated at the server.

Figure 3:
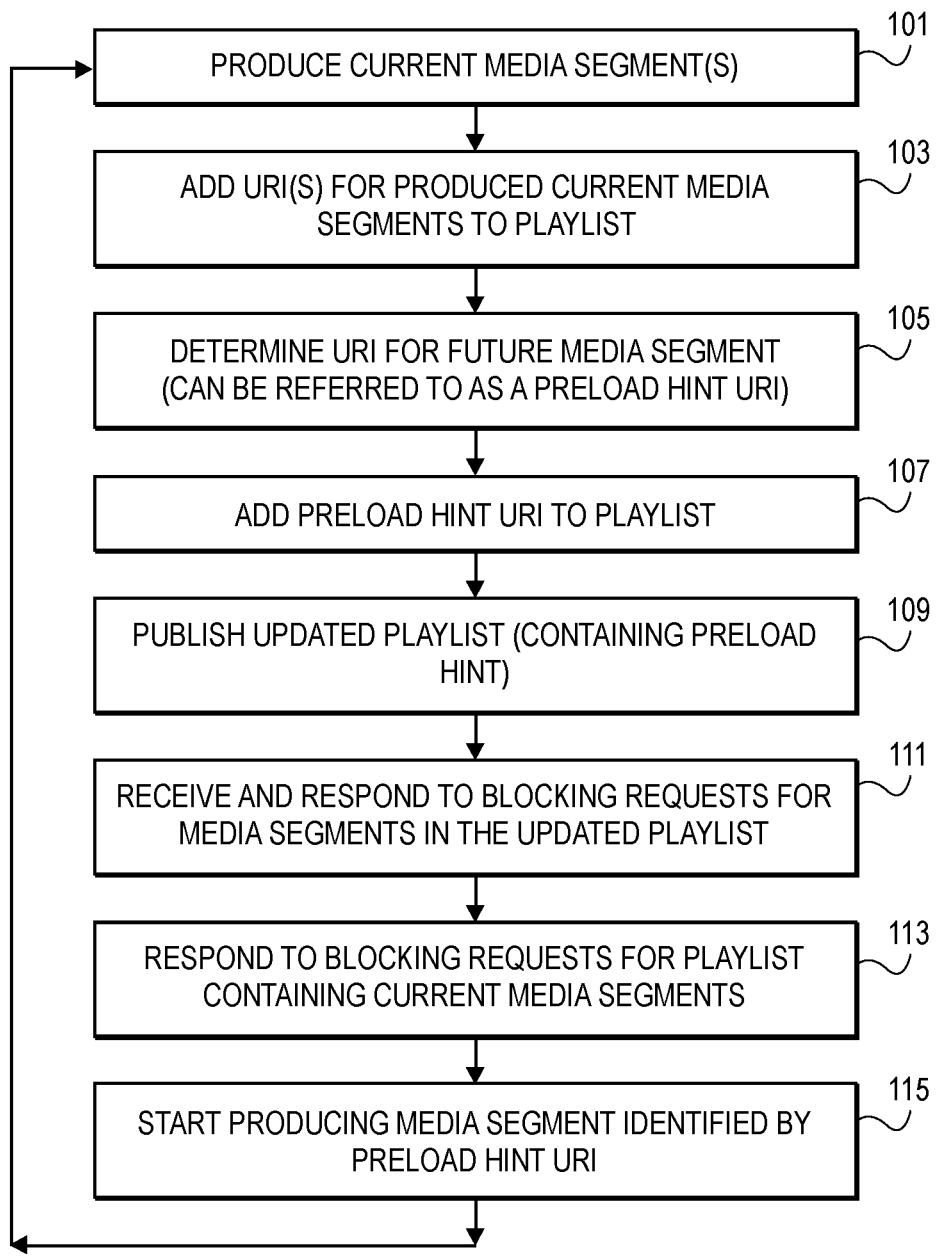
FIG. 3 shows a flowchart which illustrates a method that can be performed by one or more server systems according to an aspect described herein.

FIG. 3 shows a method which can be performed by one or more servers, such as an origin server. This method in FIG. 3 can operate in conjunction with the method performed by a client device, such as the method shown in FIG. 2. In operation 101, an origin server can produce a set of one or more media segments that are generated by a media source, such as a camera or a set of cameras or data processing systems producing animations, etc. The production of current media segments can use conventional media encoding techniques that are known in the art to create media segments that can be referred to or identified by URIs in a playlist. In operation 103, the origin server can add URIs for each of the produced current media segments to a playlist which can be an update playlist which is providing URIs for a live sports events or other live programs. In operation 105, the origin server can determine the URI for a future media segment; in one implementation this can be referred to as a preload hint URI. In one implementation, the origin server can keep track of these URIs for future media segments and can derive these URIs are based upon the prior URIs for the media segments. For example, the URI for a future media segment in the current update playlist can be based upon a numerical sequence of the existing URIs that were added in operation 103. In one implementation, the server device can employ a known predetermined numbering convention that can be used to derive the preload hint URI from the last media sequence number in the last URI added in operation 103. As used herein, a "future media segment" is a media segment that is expected to be in the next update playlist available from the one or more origin servers providing the streaming media content. The known predetermined numbering convention can be the use of integers in a known sequence, where the integer for the last media sequence number in the playlist is incremented by one (1) to derive the URI for the next media segment in the next update playlist. It will be appreciated that alternative numbering conventions can be used to create the preload hand URI in operation 105. Once the preload hint URI has been determined, it is added in operation 107 to the current playlist. In operation 109, the server then publishes the updated playlist which contains the preload hint URI added in operation 107. The publication of the updated playlist can be performed by providing the updated playlist to content delivery network servers in one implementation. In operation 111 one or more servers can receive and respond to blocking requests for media segments in the updated playlist. These blocking requests can be for the future media segments identified by the preload hint URI which was added to the playlist in operation 107. The one or more servers will respond to the blocking requests after blocking the request; another words, when the blocking request is received, the server will block a response to the request until the future media segment is available, and then once it is available the server will respond to the blocking request by providing the future media segment. The one or more servers can also perform operation 113 by responding to blocking requests for an update playlist containing URIs for the current media segments. The one or more servers will receive the blocking requests for the update playlist and will block a response to this request until the update playlist is available (after it has been completed). In operation 115, the one or more servers, such as origins servers, start producing the media segment identified by the preload hint URI. Once that media segment is produced, any blocking requests for that media segment can be responded to. The method of FIG. 3 continues in a loop over time as the one or more servers produce new media segments and respond to requests for those media segments and respond to requests for updated playlists over time.

The methods described herein can use playlists that are created by origin servers and used by client devices, and the following example shows a playlist which includes a preload hint URI described above.

. . .

EXT-X-PART:DURATION=0.40000, URI="filePart87.8.ts"
EXT-X-PART:DURATION=0.40000, INDEPENDENT=YES,URI="filePart87.9.ts"
EXT-X-PART:DURATION=0.36667, URI="filePart87.10.ts"
EXTINF:3.96667,
fileSequence87.ts
EXT-X-PART:DURATION=0.40000, INDEPENDENT=YES,URI="filePart88.0.ts"
EXT-X-PRELOAD-HINT:URI="filePart88.1.ts"

A client device, upon seeing the preload hint URI in this example (#EXT-X-PRELOAD-HINT: URI="filePart88.1.ts") and having sufficient space in its download buffers, can issue a blocking request for the future media segment identified by this preload hint URI using the URI in the preload hint URI. This can correspond to operation 57 shown in FIG. 2. At the same time, the client device can also issue a blocking request for an update playlist, and this can correspond to operation 59 shown in FIG. 2.

Figure 4:
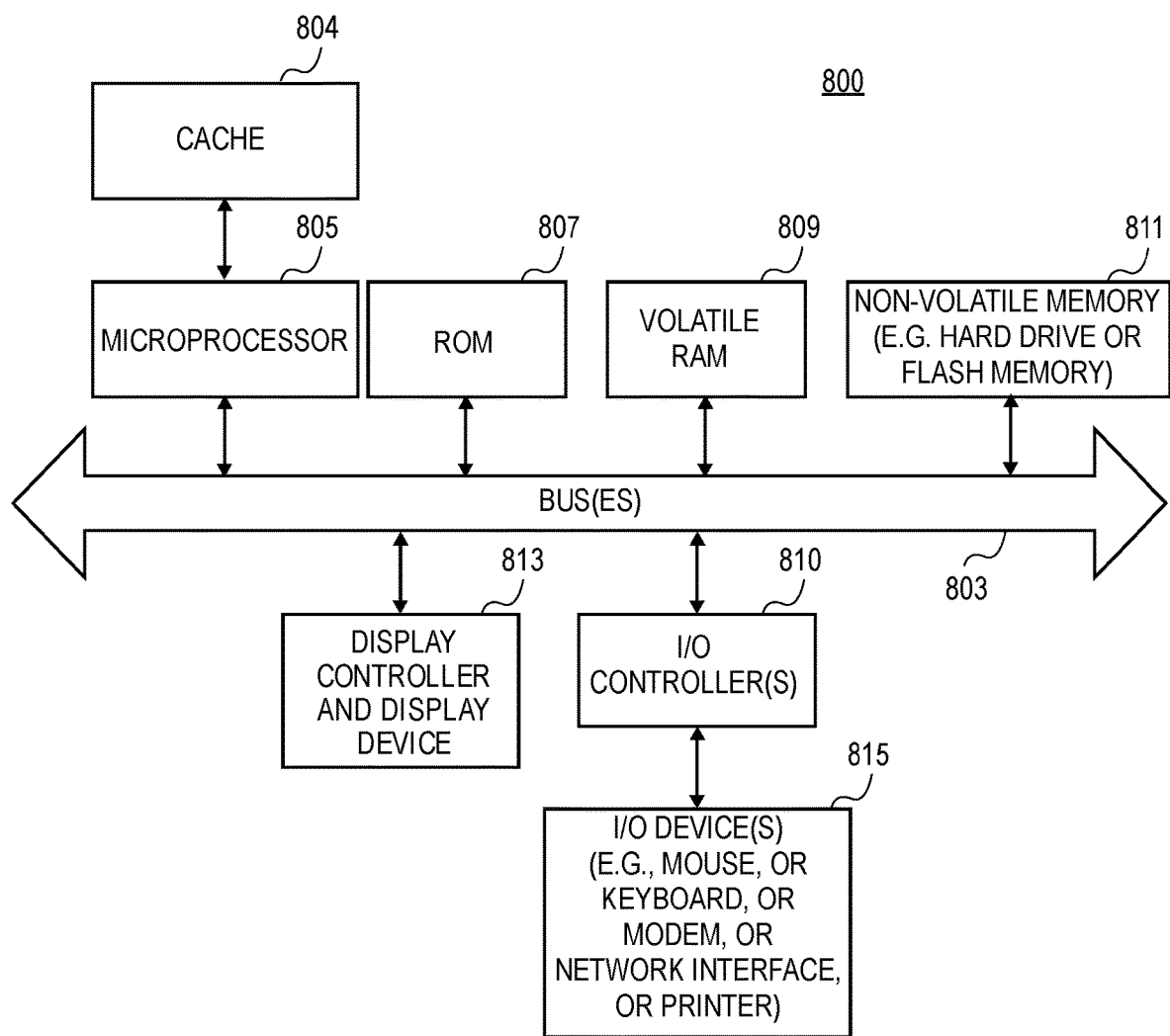
FIG. 4 shows an example of a data processing system that can be used to perform one or more methods described herein or can be used to implement a system according to one or more embodiments described herein.

FIG. 4 shows one example of a data processing system 800, which may be used with one or more embodiments described herein. For example, the system 800 may be implemented to provide a client system or device that performs the one or more methods described herein. Note that while FIG. 4 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 4, the device 800, which is a form of a data processing system, includes a bus 803 which is coupled to one or more microprocessor(s) 805 and a ROM (Read Only Memory) 807 and volatile RAM 809 and a non-volatile memory 811. The one or more micro processor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 4 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); dynamic random access memory ("DRAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method comprising:
   receiving a first playlist in a transfer protocol compliant manner, the first playlist comprising a plurality of uniform resource identifiers (URIs), the plurality of URIs indicating an order of playback of multiple media segments that can be received, in the transfer protocol compliant manner, to recreate a stream of data, the first playlist comprising a last URI in the order that identifies a last available media segment in the first playlist;
   receiving one or more of the multiple media segments;
   detecting, in the first playlist, a first URI that identifies a future media segment that was not available when the first playlist was created;
   sending, in response to detecting the first URI that identifies the future media segment, a first blocking request for the future media segment;
   sending, in response to receiving the first playlist, a second blocking request for a first updated playlist; and
   receiving the first updated playlist.

2. The medium as in claim 1, wherein the method further comprises: receiving a media segment corresponding to the first URI that identifies the future media segment.

3. The medium as in claim 2, wherein the first blocking request is sent to a first server and the second blocking request is sent to a second server which is in a different domain than the first server's domain.

4. The medium as in claim 2 wherein the transfer protocol compliant manner is based on one of HTTP1 or HTTP2 and wherein the first blocking request and the second blocking request are separate and distinct requests that are sent separately.

5. The medium as in claim 2 wherein the first blocking request causes a server that receives the first blocking request to block a response to the first blocking request until the future media segment is available, and wherein the second blocking request causes a server that receives the second blocking request to block a response to the second blocking request until the first updated playlist is available.

6. The medium as in claim 5 wherein the first URI that identifies the future media segment follows the last URI in the first playlist and the future media segment is presented immediately after the presentation of the media segment identified by the last URI.

7. The medium as in claim 5, wherein the method further comprises: mapping the future media segment to a regular media segment in response to detecting that the first URI is now associated with the regular media segment in the first updated playlist.

8. The medium as in claim 5, wherein the method further comprises: detecting, in the first updated playlist, a second URI that identifies a further future media segment that was not available when the first updated playlist was created;
sending, in response to detecting the second URI that identifies the further future media segment, a third blocking request for the further future media segment;
sending, in response to receiving the first updated playlist, a fourth blocking request for a second updated playlist.

9. The medium as in claim 1, wherein the method further comprises: determining whether the first URI is now associated with a regular media segment in the first updated playlist; and abandoning use of the first URI in response to (1) determining that the first URI is not associated with a regular media segment in the first updated playlist and (2) determining that the first updated playlist no longer identifies the first URI as the next future media segment.

10. The medium as in claim 1, wherein the method further comprises: determining whether the first URI is now associated with a regular media segment in the first updated playlist; and sending a third blocking request for a second updated playlist in response to (1) determining that the first URI is not associated with a regular media segment in the first updated playlist and (2) determining that the first updated playlist still identifies the first URI as the next future media segment.

11. A non-transitory machine readable medium storing executable program instructions which when executed by a data processing system cause the data processing system to perform a method comprising:
   generating a first playlist for use in a transfer protocol compliant manner, the first playlist comprising a plurality of uniform resource identifiers (URIs), the plurality of URIs indicating an order of playback of multiple media segments that can be received at a client device, in the transfer protocol compliant manner, to recreate a stream of data at the client device, the first playlist comprising a last URI in the order that identifies a last available media segment in the first playlist;
   determining a first URI that identifies a future media segment that is not available when the first playlist is being created;
   adding the first URI to the first playlist;
   receiving, from a first client device, a first blocking request for the first playlist and transmitting to the first client device, in response to the first blocking request, the first playlist if it is available.

12. The medium as in claim 11, wherein the method further comprises:
   blocking a response to the first blocking request until the first playlist is completed and available.

13. The medium as in claim 12 wherein a socket connection, established for the first blocking request from the first client device, is kept open while the response to the first blocking request is blocked and while the first playlist is transmitted to the first client device.

14. The medium as in claim 12, wherein the data processing system is a set of one or more origin servers that complete the creating of the first playlist to thereby make the first playlist available for transmission to one or more client devices.

15. The medium as in claim 12 wherein the first playlist specifies that the data processing system can support requests for future media segments to provide a low latency streaming service.

16. The medium as in claim 12, wherein the method further comprises:
   updating the first playlist to create a first updated playlist and determining a second URI that identifies a further future media segment that is not available when the first updated playlist is being created, and adding, into the first updated playlist, the second URI;

receiving a second blocking request for the first updated playlist;

transmitting, in response to the second blocking request, the first updated playlist when the first updated playlist is available, the response to the second blocking request being blocked until the first updated playlist is available.

17. The medium as in claim 16 wherein the first updated playlist is transmitted and is not blocked even though the further future media segment is not available.

18. The medium as in claim 11, wherein the data processing system receives a second blocking request for the future media segment and blocks a response to the second blocking request until the future media segment is available.

19. The medium as in claim 11, wherein the first blocking request is sent to the data processing system that is in a first domain and a second blocking request is sent to a different data processing in a second domain that is not part of the first domain.

20. A machine implemented method comprising:
receiving a first playlist in a transfer protocol compliant manner, the first playlist comprising a plurality of uniform resource identifiers (URIs), the plurality of URIs indicating an order of playback of multiple media segments that can be received, in the transfer protocol compliant manner, to recreate a stream of data, the first playlist comprising a last URI in the order that identifies a last available media segment in the first playlist;

receiving one or more of the multiple media segments;

detecting, in the first playlist, a first URI that identifies a future media segment that was not available when the first playlist was created;

sending, in response to detecting the first URI that identifies the future media segment, a first blocking request for the future media segment;

sending, in response to receiving the first playlist, a second blocking request for a first updated playlist; and receiving the first updated playlist.

21. The method as in claim 20, wherein the method further comprises: receiving a media segment corresponding to the first URI that identifies the future media segment.

22. The method as in claim 21, wherein the first blocking request is sent to a first server and the second blocking request is sent to a second server which is in a different domain than the first server's domain.

23. The method as in claim 21, wherein the transfer protocol compliant manner is based on one of HTTP1 or HTTP2 and wherein the first blocking request and the second blocking request are separate and distinct requests that are sent separately.

24. The method as in claim 21, wherein the first blocking request causes a server that receives the first blocking request to block a response to the first blocking request until the future media segment is available, and wherein the second blocking request causes a server that receives the second blocking request to block a response to the second blocking request until the first updated playlist is available.

25. The method as in claim 24 wherein the first URI that identifies the future media segment follows the last URI in the first playlist and the future media segment is presented immediately after the presentation of the media segment identified by the last URI.

26. The method as in claim 24, wherein the method further comprises: mapping the future media segment to a regular media segment in response to detecting that the first URI is now associated with the regular media segment in the first updated playlist.

* * * * *